(12) United States Patent
Gupta

(10) Patent No.: US 9,122,511 B2
(45) Date of Patent: *Sep. 1, 2015

(54) USING PREPROVISIONED MUTATED TEMPLATES

(71) Applicant: International Business Machines Corporation, Armonk, NY (US)

(72) Inventor: Manish Gupta, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/738,952

(22) Filed: Jan. 10, 2013

(65) Prior Publication Data

US 2014/0196032 A1    Jul. 10, 2014

(51) Int. Cl.
G06F 9/455    (2006.01)
G06F 9/445    (2006.01)

(52) U.S. Cl.
CPC .............. *G06F 9/45558* (2013.01); *G06F 8/63* (2013.01); *G06F 2009/45562* (2013.01)

(58) Field of Classification Search
None
See application file for complete search history.

(56) References Cited

U.S. PATENT DOCUMENTS

| 8,073,926 | B2 | 12/2011 | Traut et al. |
| 2008/0127348 | A1 | 5/2008 | Largman et al. |
| 2009/0292737 | A1 | 11/2009 | Hayton |
| 2011/0035802 | A1 | 2/2011 | Arajujo, Jr. et al. |
| 2011/0047133 | A1* | 2/2011 | Alpern et al. ................. 707/695 |
| 2012/0096457 | A1 | 4/2012 | Gupta et al. |
| 2012/0257820 | A1* | 10/2012 | Sanghvi et al. ............... 382/159 |
| 2013/0227089 | A1* | 8/2013 | McLeod et al. ............... 709/220 |

OTHER PUBLICATIONS

Iceberg: An image streamer for space and time efficient provisioning of virtual machines, ICPP Workshop, 2008.
Mirage: http://w3.research.ibm.com/mirage.
Typical Virtual Appliances: An optimized mechanism for virtual appliances provisioning and management, The Journal of Systems and Software. Nov. 2010.
Distributed Caching Algorithms for Content Distribution Networks, INFOCOM 2010.
Rapid provisioning of cloud infrastructure leveraging peer-to-peer networks, ICDCS Workshop, 2009.
Efficient Virtual Machine Caching in Dynamic Virtual Clusters, ICAPDS workshop 2007.

* cited by examiner

*Primary Examiner* — Diem Cao
(74) *Attorney, Agent, or Firm* — Garg Law Firm, PLLC; Rakesh Garg; Parashos T. Kalaitzis

(57) ABSTRACT

Illustrative embodiments include a method for creating a virtual machine using a preprovisioned mutated template. A template to use for creating the virtual machine is identified, a template including data usable to create the virtual machine on a data processing system. A block of data is selected in the mutated template for reconstructing the template from the mutated template. The block of data is included in the mutated template at a location specified in a manifest associated with the mutated template. A data structure of the template is populated with the block of data such that the block of data occupies a predetermined position in the template, thereby reconstructing the template from the mutated template. The virtual machine is created on the data processing system using the template.

11 Claims, 14 Drawing Sheets

USING PREPROVISIONED MUTATED TEMPLATES

TECHNICAL FIELD

The present invention relates generally to a method for installing or provisioning virtual machines. Particularly, the present invention relates to a method, system, and computer program product for using preprovisioned mutated templates for installing a variety of virtual machine (VM) configurations on a compute node.

BACKGROUND

Certain data processing systems are configured to process several workloads simultaneously. For example, separate virtual data processing systems, such as separate VMs, configured on a single host data processing system often process separate workloads for different clients or applications. The host data processing system is also called a computing node or a compute node.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

VMs are installed or created on a compute node as needed for processing workloads, meeting service level requirements, and many other reasons. Furthermore, different configurations of VMs may be needed for different purposes. For example, when a VM is created just for providing a user a general purpose computing platform, the VM may be created only with the basic operating system and no applications. In another example, when a new VM has to provide application services, the VM may be created with an operating system and an application server configured thereon. Similarly, many different configurations of VMs may be preconfigured as template images (templates). When a VM having a specific predetermined configuration has to be created on a compute node, a suitable template is selected from a template storage, such as a database or a file-system, and installed on the compute node to create a VM having the desired configuration.

SUMMARY

The illustrative embodiments provide a method, system, and computer program product for creating a virtual machine using a preprovisioned mutated template. In at least one embodiment, a method for creating a virtual machine using a preprovisioned mutated template is provided. The method includes identifying, using a processor and a memory, a template to use for creating the virtual machine, a template including data usable to create the virtual machine on a data processing system. The method further includes selecting a block of data in the mutated template for reconstructing the template from the mutated template, wherein the block of data is included in the mutated template at a location specified in a manifest associated with the mutated template. The method further includes populating a data structure of the template with the block of data such that the block of data occupies a predetermined position in the template, thereby reconstructing the template from the mutated template. The method further includes creating the virtual machine on the data processing system using the template.

In another embodiment, the method further includes identifying a second block of data to be included in the template for the reconstructing. The method further includes determining that the mutated template does not include the second block of data. The method further includes receiving the second block of data from a source. The method further includes populating the data structure of the template with the second block of data such that the second block of data occupies a second predetermined position in the template.

In another embodiment, the method further includes finding a reference to the source in the manifest. The method further includes using the reference to access the source and receive the second block of data.

In another embodiment, the source is known to provide the second block of data.

In another embodiment, the method further includes receiving information describing a structure of the template. The method further includes identifying the block of data as being a part of the structure of the template. The method further includes further identifying, using the structure, the location for the block of data in the template.

In another embodiment, the location of the block of data in the template is different from the location of the block of data specified in the manifest associated with the mutated template.

In another embodiment, the manifest specifies a plurality of blocks of data to be included in the template, the plurality of blocks of data including the block of data, wherein the manifest further specifies a first position for the block of data in the template. The method further includes identifying, using the manifest, a position of the block of data in the mutated template. The method further includes moving the block of data from the position in the mutated template to the position in the template.

In another embodiment, the method further includes modifying a data structure of the mutated template to transform the data structure of the mutated template into the data structure of the template, and wherein the moving is a part of the modifying.

In another embodiment, the method further includes receiving a request for creating the virtual machine, wherein the identifying the template is responsive to receiving the request.

In another embodiment, the manifest corresponds to the template.

In another embodiment, the manifest corresponds to the mutated template.

BRIEF DESCRIPTION OF THE SEVERAL VIEWS OF THE DRAWINGS

The novel features believed characteristic of the invention are set forth in the appended claims. The invention itself, however, including a preferred mode of use, further objectives and advantages thereof, will best be understood by reference to the following detailed description of illustrative embodiments when read in conjunction with the accompanying drawings, wherein:

DETAILED DESCRIPTION

Figure 1:
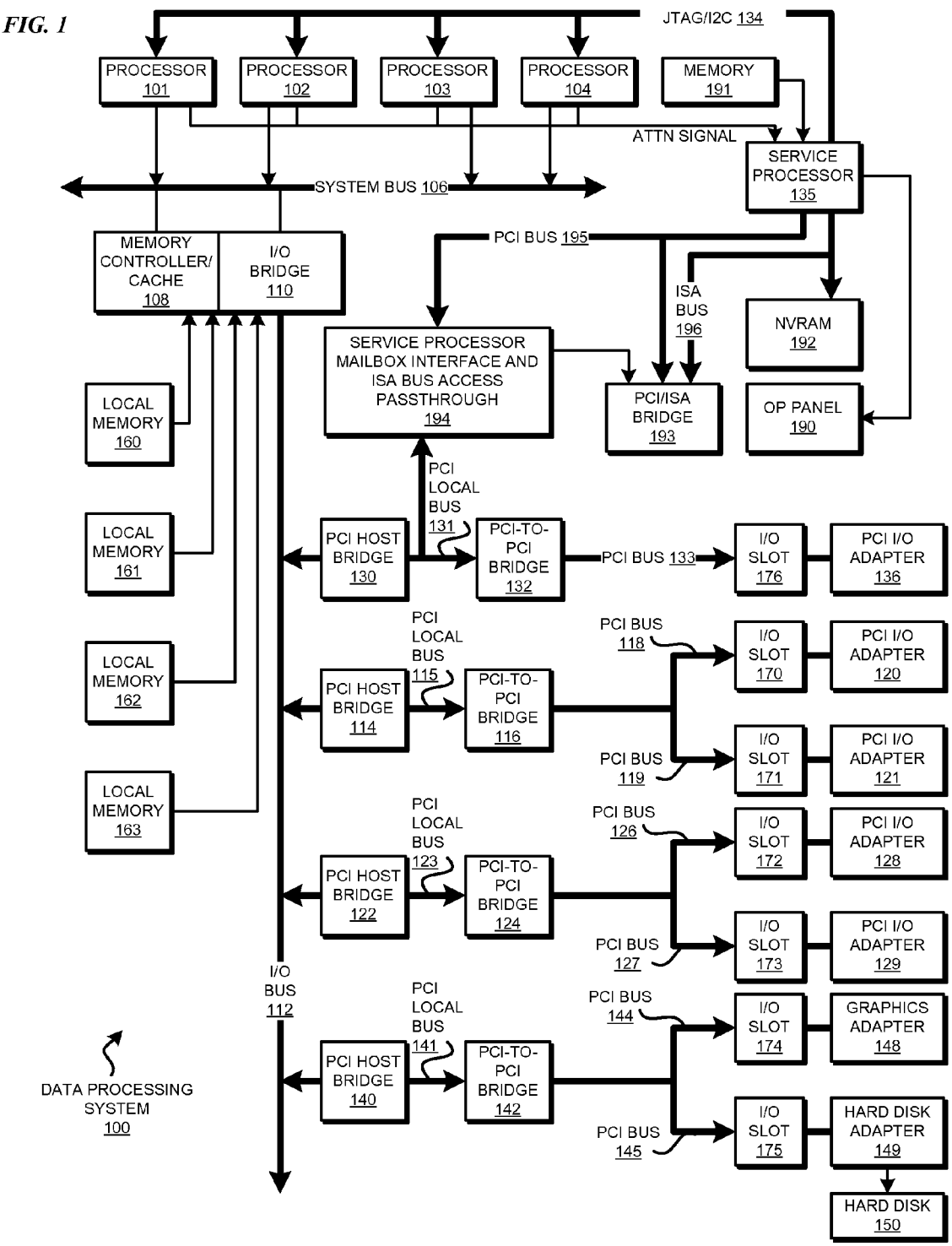
FIG. 1 depicts a block diagram of a data processing system in which the illustrative embodiments may be implemented.

An embodiment is usable with templates of any size without limitation. Presently, the size of a typical template is of the order of Gigabytes (GB). A typical virtualized data processing environment can employ hundreds or even thousands of different VM configurations. Consequently, such an environment may store hundreds or thousands of templates corresponding to those VM configurations.

Generally, when a compute node has to install a VM of a particular configuration, the compute node transfers a corresponding template from a template repository over a data network. In some virtualized data processing environments, copies of certain templates are stored, or preprovisioned, on certain compute nodes so that when the need for the corresponding VM arises, the VM can be created expeditiously, without having to transfer the template over a data network.

The illustrative embodiments recognize that practical compute nodes have limited local or remote storage space available to them for storing templates. Accordingly, only a limited number of templates can be preprovisioned on a compute node, and a template that is not preprovisioned on the compute node has to be transferred from a template storage when a corresponding VM has to be created on the compute node.

The illustrative embodiments further recognize that transporting templates over a data network adds significant data traffic to the data network. The illustrative embodiments also recognize that even with certain templates being locally stored at a compute node, the compute node has to transfer non-locally stored templates over the data network when those non-locally stored templates are needed.

The illustrative embodiments recognize that presently, either a template is entirely available locally at a compute node, or has to be entirely transferred from a template storage system. Furthermore, the illustrative embodiments recognize that a virtualized data processing environment is a dynamic environment in that existing templates are changed and new templates are created over time to address new or different requirements. When certain workloads or requirements no longer exist in the environment, existing templates may be deleted to recover storage space for the new or changed templates. Thus, presently, template data continues to form a significant portion of the data traffic in a virtualized data processing environment.

The illustrative embodiments used to describe the invention generally address and solve the above-described problems and other problems related to preprovisioning templates. The illustrative embodiments provide a method for using preprovisioned mutated templates.

Generally, from a set of templates available for provisioning, an embodiment of the invention selectively combines all or part of a subset of templates. For example, a template's data can be divided into blocks of same or different sizes. An embodiment creates a mutated template using all or some blocks of the templates in the subset.

An embodiment selects the blocks that are to be included in the mutated template based on a variety of criteria. For example, in one embodiment, the blocks are selected based on an descending order of common blocks amongst the subset of templates. In another embodiment, some blocks are included in or excluded from the mutated template based on a policy. Another embodiment uses a prediction technique to select the subset of templates, select blocks within the subset, or a combination thereof.

An embodiment further creates one or more manifests corresponding to the mutated template. For example, an embodiment creates a manifest that describes the nature and location of the blocks included in the mutated template. Using such a manifest, another embodiment can reconstruct all or part of a specific template that is a member of the subset used to create the mutated template.

Another embodiment creates a set of manifests corresponding to the mutated template. A manifest in the set of manifests informs another embodiment how to reconstruct a specific template from the mutated template. An embodiment can create any number of mutated templates and sets of one or more manifests.

An embodiment transmits a mutated template and a set of corresponding manifests to another embodiment. The other embodiment reconstructs all or part of a template using the mutated template and one or more manifests in the set of manifests.

Under certain circumstances, the size of the mutated template being created may be limited by a threshold size or policy. Accordingly, an embodiment may include only some blocks of a template into a mutated template. When a block of a template is not included in the mutated template (non-included block), one embodiment includes in a manifest a non-included reference to the block that is omitted from the mutated template. A non-included reference is a reference to a source from where the non-included block can be obtained. An embodiment can use the non-included reference to obtain the block from that source.

In another embodiment, a manifest corresponding to a mutated template includes no reference to a non-included block. An embodiment that is reconstructing a template using the manifest uses other knowledge or information available to the embodiment to obtain the non-included block.

The illustrative embodiments are described with respect to certain designs, templates, and manifests only as examples. Such descriptions are not intended to be limiting on the invention.

Furthermore, the illustrative embodiments may be implemented with respect to any type of data, data source, or access to a data source over a data network. Any type of data application or storage device may provide the data, such as data for deploying or configuring an application, to an embodiment of the invention, either locally at a data processing system or over a data network, within the scope of the invention.

An embodiment of the invention may be implemented with respect to any type of application, such as, for example, applications that are served, the instances of any type of server application, a platform application, a stand-alone application, an administration application, or a combination thereof. An application, including an application implementing all or part of an embodiment, may further include data objects, code objects, encapsulated instructions, application fragments, services, and other types of resources available in a data processing environment. For example, a Java object, an Enterprise Java Bean (EJB), a servlet, or an applet may be manifestations of an application with respect to which the invention may be implemented (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
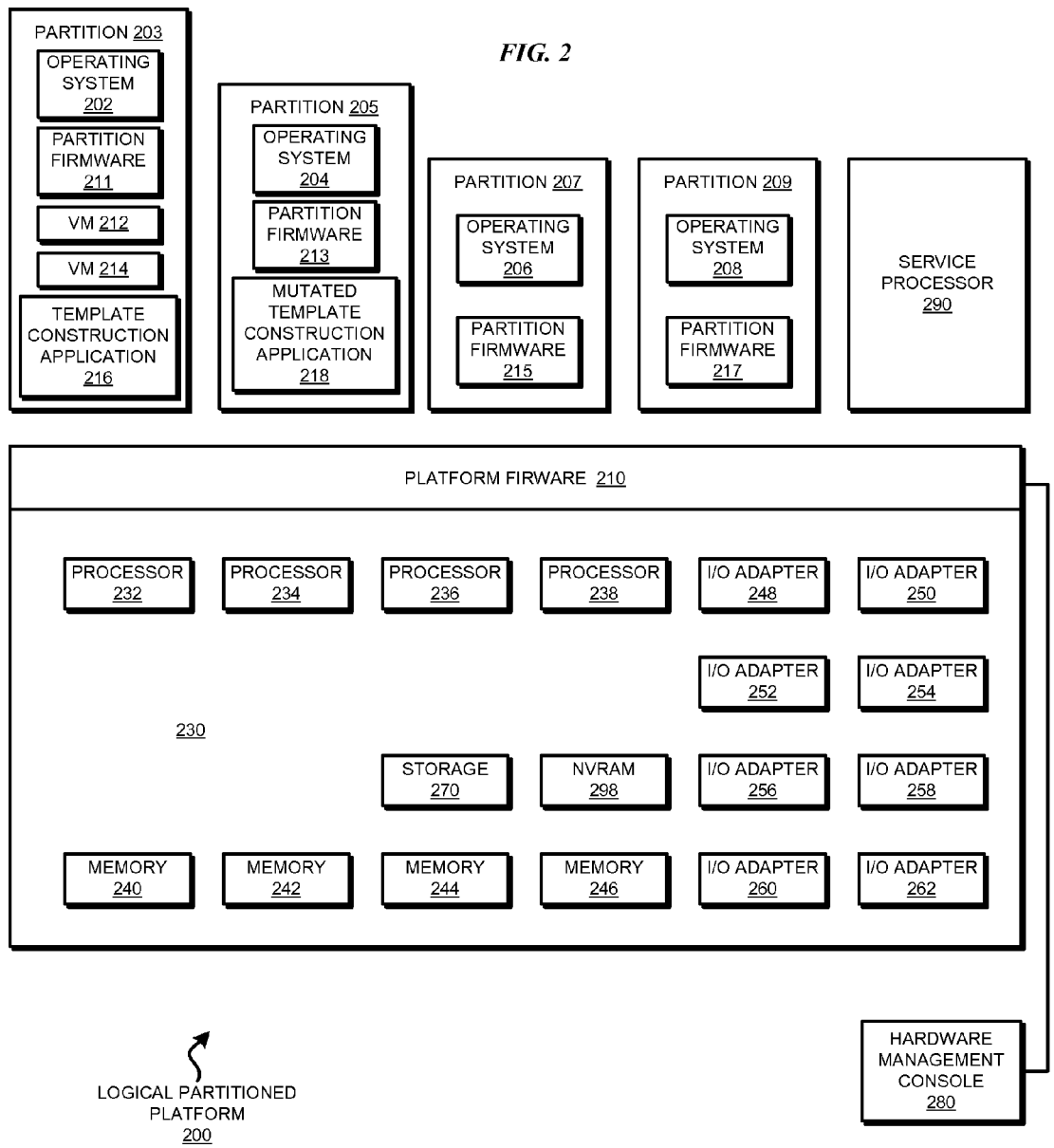
FIG. 2 depicts a block diagram of an example logically partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which is designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209, respectively.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, platform firmware 210 loads a copy of boot strap code is loaded onto partitions 203, 205, 207, and 209. Thereafter, control is transferred to the boot strap code with the boot strap code then loading the open firmware and RTAS. The processors associated or assigned to the partitions are then dispatched to the partition's memory to execute the partition firmware.

Partition 203 is an example of a compute node and includes example VMs 212 and 214. Template construction application 216 in partition 203 reconstructs a template from a mutated template according to an embodiment. Template construction application 216 comprises program instructions for carrying out the processes of any of the various embodiments. Similarly, partition 205 may be regarded as another data processing system that includes mutated template construction application 218 that creates mutated templates according to any of the various embodiments. Mutated template construction application 218 also comprises program instructions for carrying out the processes of any of the various embodiments. The program instructions may be stored on at least one of one or more computer-readable tangible storage devices (e.g., hard disk 150, NVRAM 192, or a compact disk device coupled with I/O bus 112 in FIG. 1), for execution by at least one of one or more processors (e.g., processors 101-104 in FIG. 1) via at least one of one or more computer-readable memories (e.g., any of local memories 160-163 in FIG. 1). Template construction application 216 may be implemented in any form, including but not limited to a form suitable for execution as a service, a form implemented using hardware and software, or a form suitable for integration into another application for virtual environment management.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of partitions 203, 205, 207, and 209 within logically partitioned platform 200, each of which partitions 203, 205, 207, and 209 corresponds to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logically partitioned platform 200.

Service processor 290 may be used to provide various services, such as processing of platform errors in the partitions. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
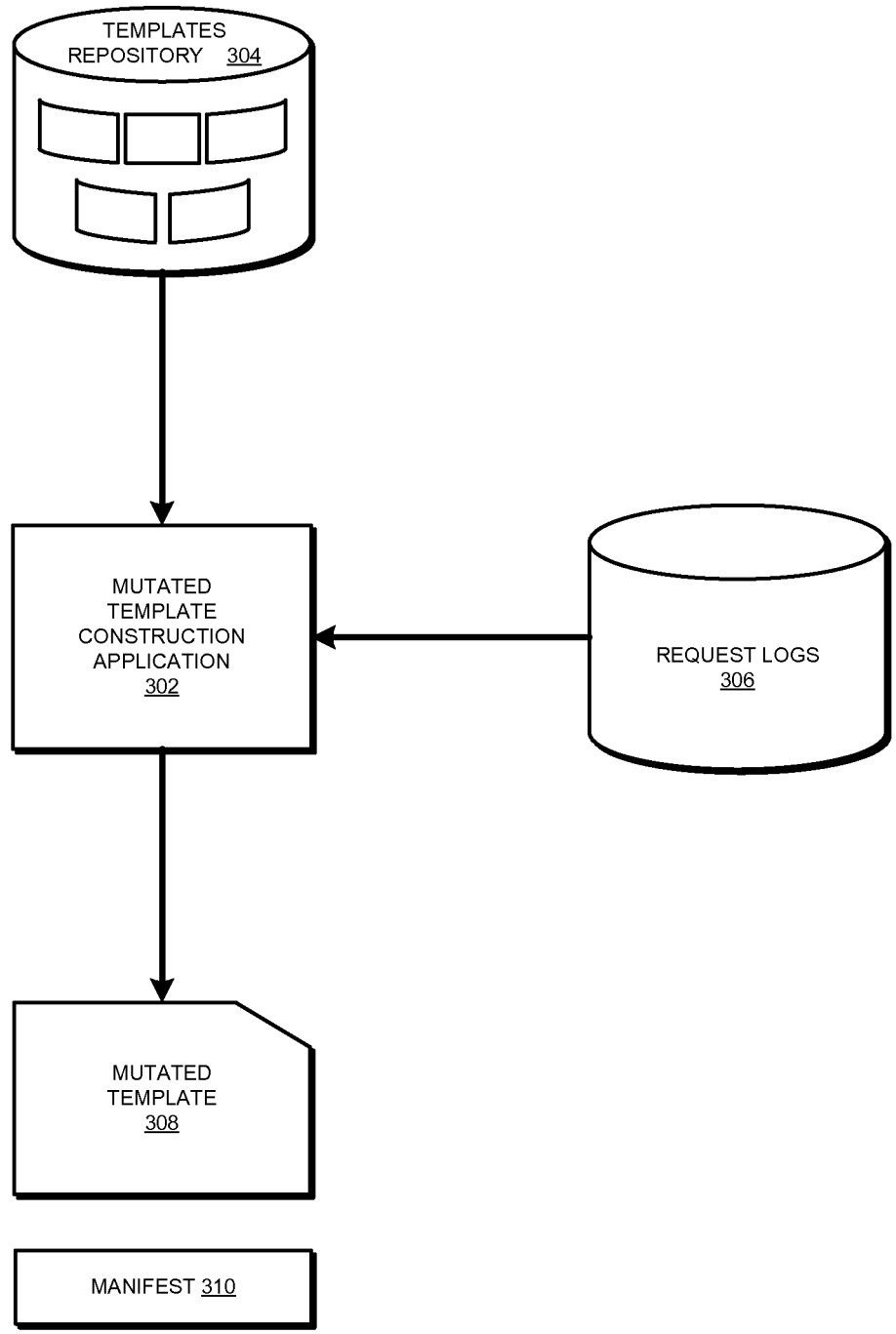
FIG. 3 depicts a block diagram of an example configuration to create mutated templates for preprovisioning in accordance with an illustrative embodiment.

With reference to FIG. 3, this figure depicts a block diagram of an example configuration to create mutated templates for preprovisioning in accordance with an illustrative embodiment. Mutated template construction application 302 is analogous to mutated template construction application 218 in FIG. 2.

Template repository 304 is any type of data repository suitable for storing templates, including but not limited to databases, file-systems, or storage networks. Note that not all templates present in template repository 304 may be available for provisioning to a compute node for creating a corresponding VM. For example, a template in template repository 304 may be for testing purposes only, not to be provisioned to a compute node for actual creation of a corresponding VM.

Request logs 306 is any suitable record of template requests received from various compute nodes operating in the virtualized data processing environment over a period. For example, template repository 304 may includes templates X, Y, and Z, which can be requested from any of compute nodes 1, 2, 3, and 4 operating in a given environment. In one embodiment, request log 306 comprises entries corresponding to a request from compute node 1 for template X at time T1, a request from compute node 1 for template X at time T1, a request from compute node 2 for template Y at time T2, a request from compute node 1 for template Y at time T3, a request from compute node 3 for template X at time T4, a request from compute node 3 for template Y at time T5, and a request from compute node 1 for template X at time T6. Request log 306 or another log (not shown) may also include entries corresponding to a time at which an existing template, such as template X, is deleted or changed in, and a time at which a new template, such as template A, is added to template repository 304.

Using information from request log 306, and a subset of templates available for provisioning in template repository 304, mutated template construction application 302 constructs mutated template 308. Mutated template construction application 302 further constructs manifest 310 corresponding to mutated template 308. Manifest 310 is a set of one or more manifests and includes manifest data according to any of the various embodiments described herein.

Figure 4:
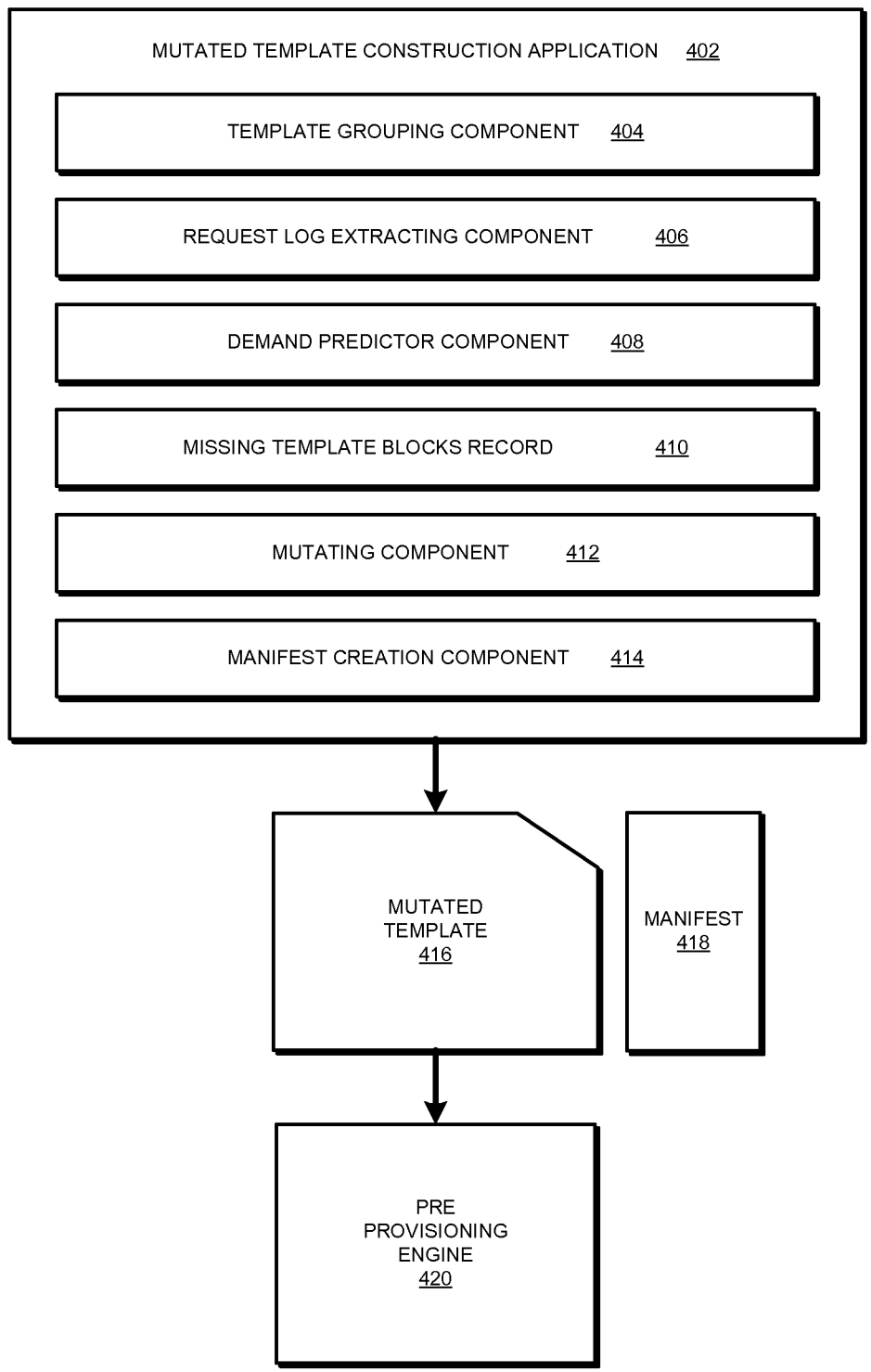
FIG. 4 depicts a block diagram of an example configuration of a mutated template construction application in accordance with an illustrative embodiment.

With reference to FIG. 4, this figure depicts a block diagram of an example configuration of a mutated template construction application in accordance with an illustrative embodiment. Mutated template construction application 402 can be used as mutated template construction application 302 in FIG. 3.

In the depicted example configuration, mutated template construction application 402 includes template grouping component 404, request log extracting component 406, demand predictor component 408, component 410 to create missing template blocks record, mutating component 412, and manifest creating component 414. Mutated template construction application 402 outputs mutated template 416 and a set of one or more manifests 418 to preprovisioning engine 420. Preprovisioning engine 420 preprovisions a subset of templates, such as a subset of templates available for provisioning in template repository 304 in FIG. 3 and fully or partially combined (mutated) into mutated template 416, to one or more compute nodes (not shown).

Template grouping component 404 selects a subset of templates available for provisioning in a template repository. Template grouping component 404 also determines a manner in which to combine all or some blocks of the templates in that selected subset.

For example, in one embodiment, request log extractor component 406 reads a request log, such as request log 306 in FIG. 3, for template requests received over a period from the compute nodes in a given environment. Request log extractor component 406 identifies the templates that were requested over that period. The identified templates form the subset of templates. In one embodiment, only those templates that were requested more than a threshold number of times during the period are included in the subset.

In an embodiment, template grouping component 404 further arranges the templates in the subset in a decreasing order of requests for those templates. For example, suppose that according to request log extractor component 406, template A was requested three times, template B was requested 2 times, and template C was requested one time over the period. Template grouping component 404 forms a subset of templates A and B, and arranges templates A and B in order (A,B) according to their demand.

In an embodiment, template grouping component 404 further uses demand predictor component 408 to select and organize the subset. For example, request log records may show that a new template D was added at time T1, and was requested one time during period T2, 5 times during period T3, and 20 times during period T4. Accordingly, demand predictor component 408 may determine that even though demand for template D has not reached a threshold demand level in a given period for template D to be included in the subset, a trend in the demand for template D shows that the demand for template D is likely to increase and exceed the threshold in another period. Accordingly, demand predictor component 408 suggests including template D in the subset, and template grouping component 404 includes and organizes template D into the subset.

The organization of templates, as performed in template grouping component 404, may take any suitable form. For example, in one embodiment, the subset of templates is simply grouped together with no particular organization. In another embodiment, the templates are arranged in the order of the demand for them.

In another embodiment, the templates in the subset are arranged in a hierarchical order. For example, template grouping component 404 may discover, or receive information about a parent-child relationship between certain templates. For example, template B may include all of template A's blocks and an additional set of blocks. The hierarchical order may depend also on the fact that template B may be derived from template A by installing or uninstalling one or more software from A. Based on this hierarchy, if one considers the blocks of A and B then B may include one or more of A's block and an additional set of blocks.

Whether a block is common to two or more templates can be ascertained in any manner suitable to an implementation within the scope of the illustrative embodiments. For example, in one embodiment, two blocks of data are considered identical in two templates, or common to the two templates, if their hash values, computed using the same hashing algorithm, match. Detection of duplicate or identical blocks enables including only one copy of the block in the mutated template from which both templates can be reconstructed, and the single copy of the block is usable for constructing either of the two templates.

Similarly, template grouping component 404 may find that template C may include all of template A's blocks and a different set of additional blocks. Template D may include all of template B's blocks and third different set of additional blocks. Accordingly, template grouping component 404 forms a hierarchical organization of the subset of templates A, B, C, and D, such that templates B and C are different children templates of parent template A, and template D is a child of template B.

Mutating component 412 uses the organization of the selected subset of templates to select all or some of the blocks from the templates in the subset. In one embodiment, mutating component 412 can compute which blocks to include and exclude from a mutated template of a given size by optimizing a cost function which may include the cost of having or not having a given block within the mutated template.

For example, in one embodiment the cost may be described as the data traffic added to a data network when a block that is not included in the mutated template is required. A non-included block of a template will be requested as many times as the template is being requested or demanded using the mutated template. Furthermore, if the non-included block occurs multiple times within a requested template, the request for the non-included block will be further multiplied by the number of times the block occurs within the template. The effective rate of request for a given non-included block will be the sum of the individual demands for that block across all templates included in the mutated template. The data traffic on the network due to this block is the rate of request for this block multiplied by the size of the block.

According to an embodiment, the optimization, which is a 0-1 Knapsack problem, selects the blocks that must be included in a mutated template of a given size to minimize the traffic on the network. The selected blocks can be included in a mutated template 416 in any order. Component 410 for recording missing template blocks records the blocks that are part of a template in the subset and not included in mutated template 416. In one embodiment, the operation of component 410 is optional.

The ordering of blocks in mutated template 416 can be performed in any suitable manner depending on the implementation. For example, if two templates in the subset are organized in a parent-child relationship, one embodiment orders the blocks of the parent template before the blocks of the child template in mutated template 416.

Another embodiment orders the blocks as follows—the most frequently requested (but selected) block for a given block position across all templates used for the construction of the mutated template is kept in that position, provided the block has not already been included earlier. Otherwise, based on the similar logic, the embodiment tries to place the next most requested (but selected) block at that position. The embodiment continues to select blocks in a descending order of frequency of request for those blocks, and place them using the above logic. If no blocks are available to be placed then the embodiment selects the most frequently requested (but selected) block for some earlier block position than the current one, but which could not yet be placed in any position so far. Thus, duplicate blocks do not occur in a mutated template. An advantage of this ordering approach according to an embodiment is that when the mutated template is used to create one of the included templates, the expected changes to block positions are minimized.

Manifest creation component 414 creates a set of one or more manifests 418. As described elsewhere in this disclosure, one embodiment creates manifest 418 such that manifest 418 describes the nature and location of the blocks included in mutated template 416. Using such a form of manifest 418, another embodiment can reconstruct all or part of a specific template that is a member of the subset used to create mutated template 416. Another embodiment creates manifest 418 such that manifest 418 includes a set of manifests corresponding to mutated template 416. Manifest 418 in this form informs another embodiment how to reconstruct a specific template from mutated template 416. For example, in this latter form, manifest 418 of an embodiment includes manifest 418x (not shown) for template X that can be requested by a user. Manifest 418x can be preprovisioned with mutated template 416, or alternatively can be transferred over the network when the user request for template X is routed to the node containing the preprovisioned instances of mutated template 416.

Figure 5:
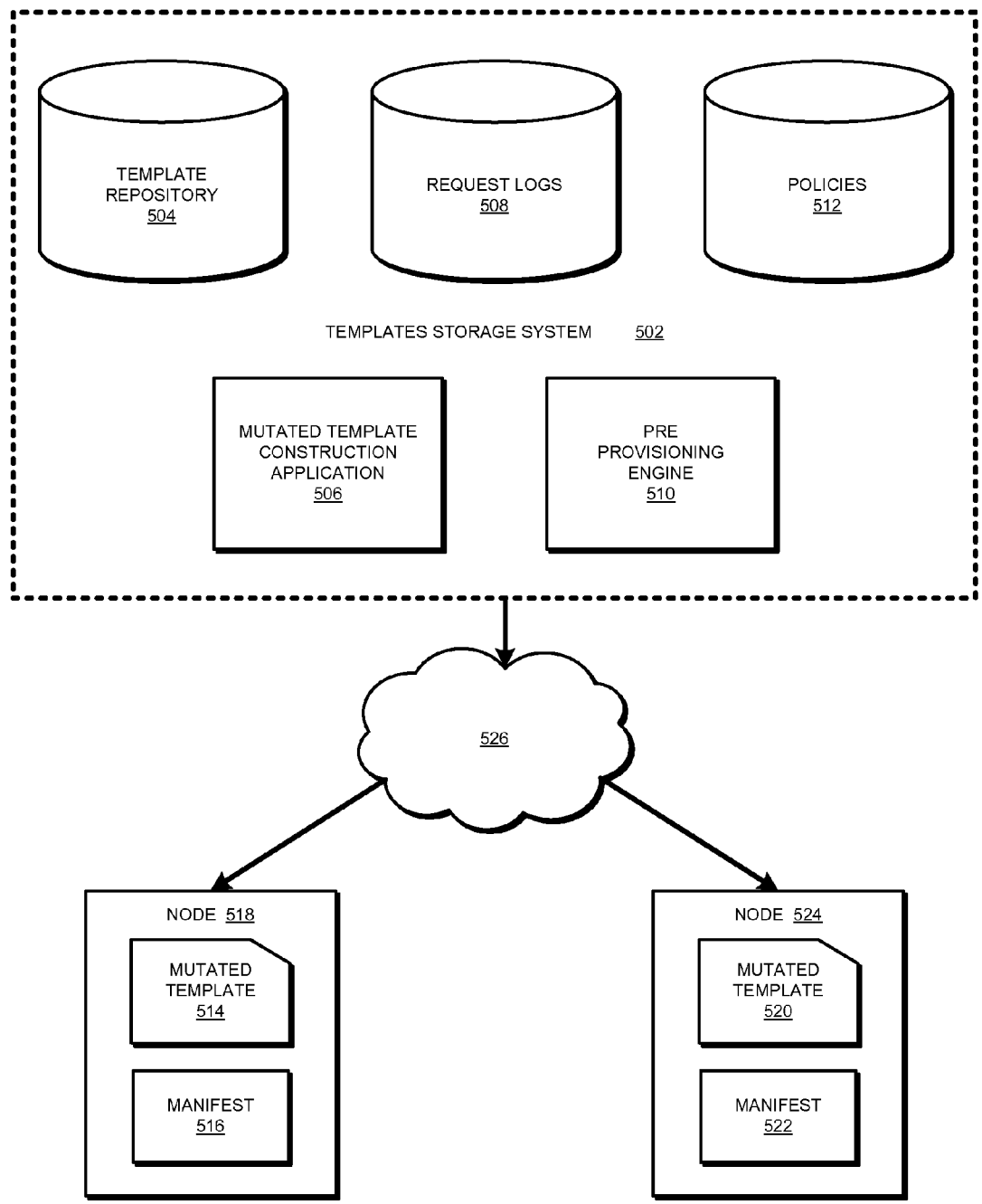
FIG. 5 depicts a block diagram of an example configuration for preprovisioning compute nodes using mutated templates in accordance with an illustrative embodiment.

With reference to FIG. 5, this figure depicts a block diagram of an example configuration for preprovisioning compute nodes using mutated templates in accordance with an illustrative embodiment. Template storage system 502 may be an embodiment of partition 205 in FIG. 2. Template storage system 502 includes or has access to template repository 504. Template repository 504 is analogous to template repository 304 in FIG. 3.

Template storage system 502 further includes mutated template construction application 506, which is analogous to mutated template construction application 402 in FIG. 4. Template storage system 502 includes or has access to request logs 508, which is analogous to request logs 306 in FIG. 3. Preprovisioning engine 510 executes in template storage system 502 or is accessible there from.

Policies 512 can be stored in a repository accessible to template storage system 502. For example, policies 512 may be stored in a database accessible to template storage system 502 over a data network. An example policy in policies 512 may cause a template to be included in a mutated template regardless of the demand for the template. Another example policy in policies 512 may cause all or some of the blocks of a particular child template to be included in a mutated template even if all blocks of the corresponding parent template are not included in the mutated template. Example policies 512 may specify the various block sizes to use, hashing algorithm to use, mutated template size threshold, request log extracting periods, demand thresholds, and any other logic, parameter, or constraint, as may be applicable in a given environment.

Template storage system 502 creates one or more mutated templates and corresponding manifests according to an embodiment. Template storage system 502 preprovisions mutated template 514, manifest 516 in compute node 518. Template storage system 502 preprovisions mutated template 520, manifest 522 in compute node 524. The preprovisioning occurs over data network 526. Mutated template 514 and manifest 516 may be different from mutated template 520 and manifest 522, respectively. In another embodiment, manifest 516 or 522 may not be preprovisioned, but be transferred to node 518 or 524 when a request for the corresponding template is routed to node 518 or 524, respectively.

Figure 6:
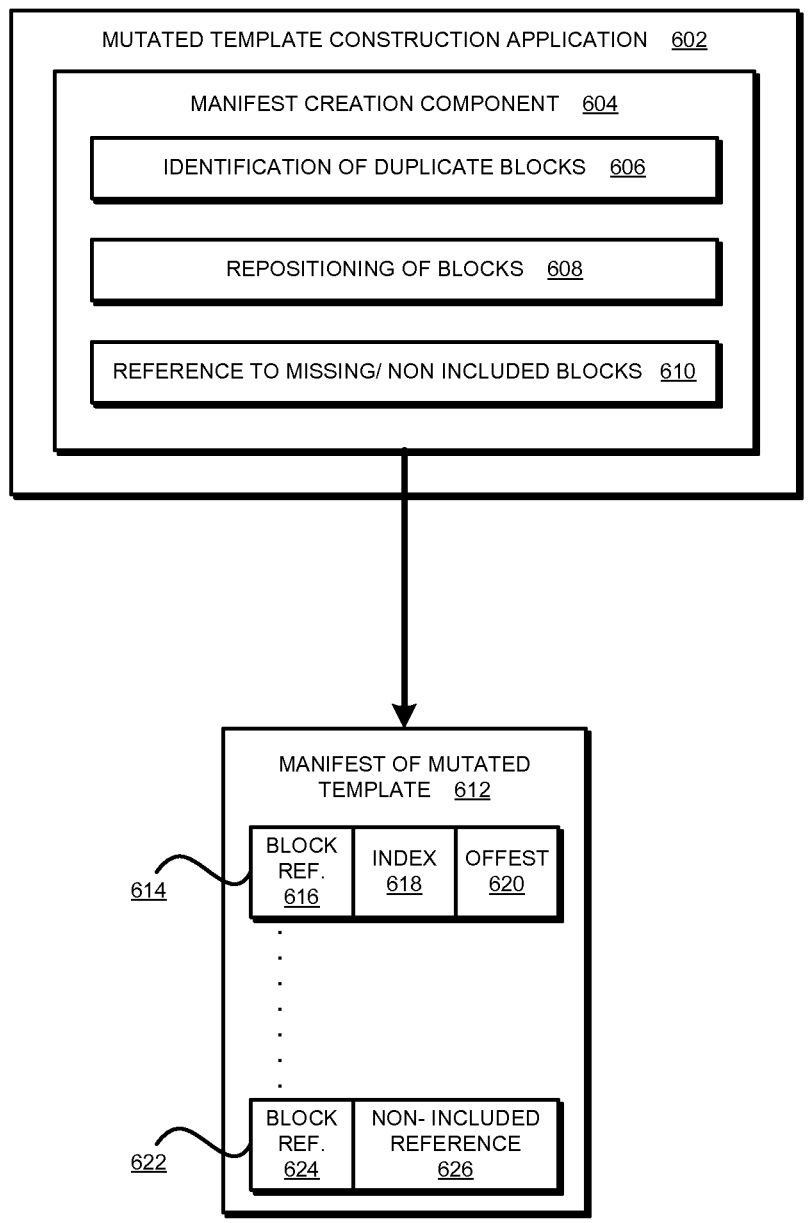
FIG. 6 depicts a block diagram of configuration to create a manifest and an example manifest in accordance with an illustrative embodiment.

With reference to FIG. 6, this figure depicts a block diagram of configuration to create a manifest and an example manifest in accordance with an illustrative embodiment. Mutated template construction application 602 is similar to mutated template construction application 506 in FIG. 5. Manifest creation component 604 is similar to manifest creation component 414 in FIG. 4.

Manifest creation component 604 includes, only as an example and without implying any limitation thereto, component 606 for identifying duplicate blocks. For example, in one embodiment, duplicate or identical blocks in two or more templates in the selected subset of templates may be identified using component 606 before the mutated template is assembled to include one copy of the duplicate blocks.

Component 608 determines the ordering of the blocks in the mutated template. As described elsewhere in this disclosure, the blocks included in the mutated template can be ordered in any manner suitable for a given implementation. In one embodiment, the blocks of a parent template are positioned earlier in the mutated template than the blocks unique to a child of the parent template. Component 610 optionally creates references to the non-included blocks.

Manifest 612 is an example manifest corresponding to the mutated template according to one embodiment. Manifest 612 can be used as manifest 418 in FIG. 4.

Manifest 612 includes a set of one or more entries 614. An example entry in entries 614 includes reference identifier 616 of an included block, index 618 at which the block appears in the mutated template, and offset 620 at which the block begins in the data of the mutated template. If the size of the blocks is variable, an additional element in the entry called "size" (not shown) providing the size of the block may also exist in manifest 612. Of course, the structure of entries 614 is not intended to be limiting on the illustrative embodiments. Those of ordinary skill in the art will be able to construct other structures for entries 614 from this disclosure and the same are contemplated within the scope of the illustrative embodiments.

Optionally, manifest 612 may also include a set of one or more entries 622. An example entry in entries 622 includes reference identifier 624 of a non-included block, and non-included reference 626 to a source from which the non-included block can be obtained. In one embodiment, non-included reference 626 points to a file or a portion thereof in a file-system.

Figure 7:
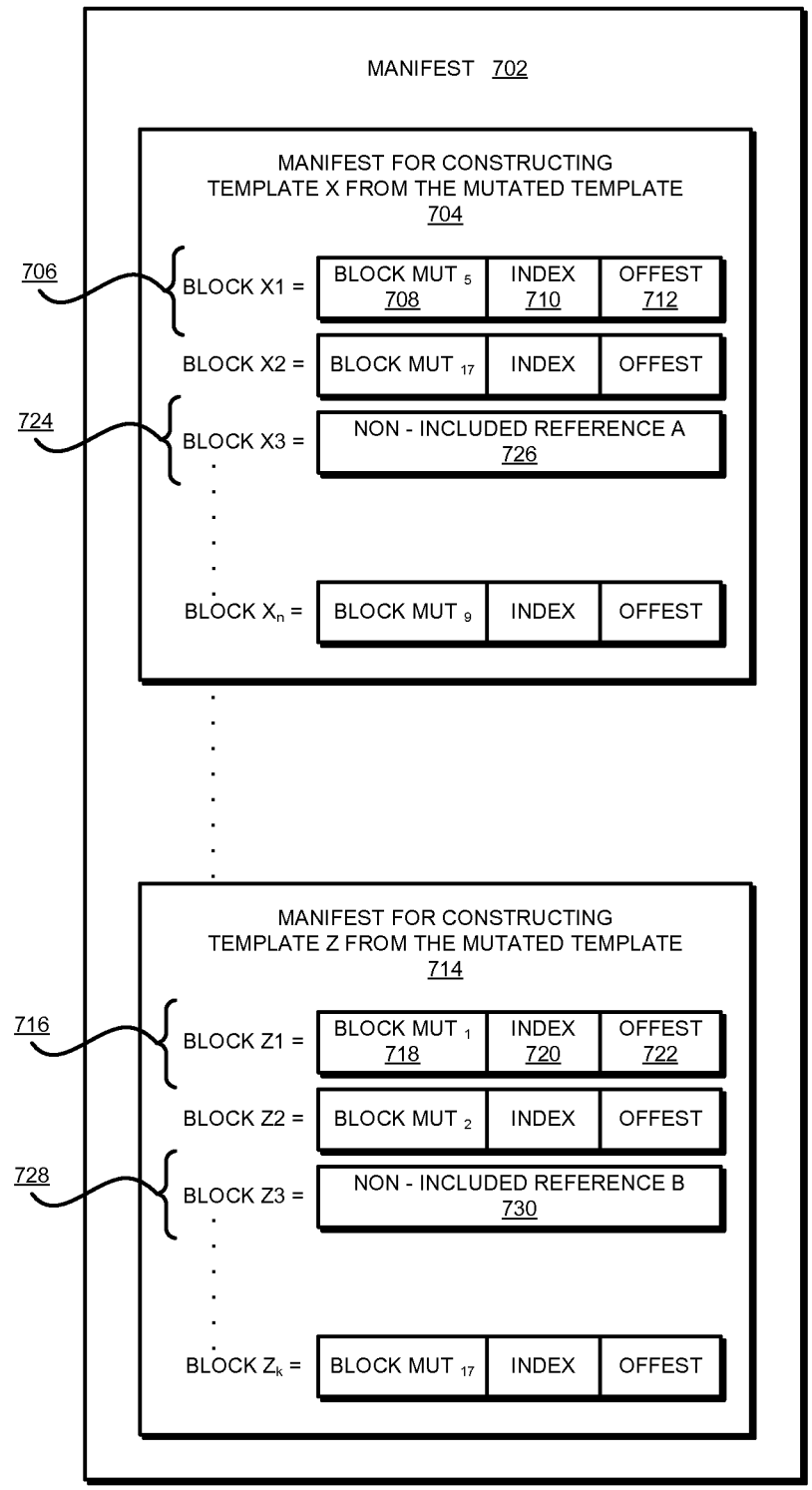
FIG. 7 depicts a block diagram of another example manifest in accordance with an illustrative embodiment.

With reference to FIG. 7, this figure depicts a block diagram of another example manifest in accordance with an illustrative embodiment. Manifest 702 can be generated from mutated template construction application 602 using manifest construction component 604 in FIG. 6. Manifest 702 can be used as manifest 418 in FIG. 4.

As depicted, manifest 702 comprises a plurality of manifests, namely manifests 704 and 714. In one embodiment, the plurality of manifests are not included within manifest 702, in fact manifest 702 as an entity does not exist, and only the plurality of manifests accompany and correspond to the mutated template.

Manifest 704 is a manifest for constructing (or reconstructing) template X from the corresponding mutated template. For example, manifest 704 includes a set of one or more entries 706. An example entry in entries 706 may be for reconstructing block 1 of template X, namely, "Block X1". According to entry 706, block X1 can be constructed using block reference 708, which refers to block 5 of the mutated template (block $Mut_5$), which appears at index 710 in the mutated template and can be read from offset 712 in the mutated template's data. Other blocks, such as blocks X2 and Xn of template X can be constructed in a similar manner using the information in entries 706.

Manifest 714 is a manifest for constructing (or reconstructing) template Z from the corresponding mutated template. For example, manifest 714 includes a set of one or more entries 716. An example entry in entries 716 may be for reconstructing block 1 of template Z, namely, "Block Z1". According to entry 716, block Z1 can be constructed using block reference 718, which refers to block 1 of the mutated template (block $Mut_1$), which appears at index 720 in the mutated template and can be read from offset 722 in the mutated template's data. Other blocks, such as blocks Z2 and Zk of template X can be constructed in a similar manner using the information in entries 716.

Optionally, some or all manifests in manifest 702 may include references for obtaining non-included blocks. For example, manifest 704 includes entry 724, which informs an embodiment, such as an embodiment implementing template construction application 216 in FIG. 2, where or how to find the referenced non-included block 3 for template X (block X3). For example, non-included reference A 726 may point to a file or a portion thereof, where block X3 is stored.

Similarly, manifest 714 includes entry 728, which informs an embodiment, such as an embodiment implementing template construction application 216 in FIG. 2, where or how to find the referenced non-included block 3 for template Z (block Z3). For example, non-included reference B 730 may cite to a database record or Uniform Resource Locator (URL), from where block Z3 can be downloaded.

As described elsewhere with respect to an embodiment, these manifests need not necessarily be preprovisioned with the mutated template, but transferred over a data network to a node upon a request for a template. For example if template X is requested at a node, manifest 704 may be transferred to that node. Similarly, if a node receives a request for template Z, an embodiment transfers manifest 714 to that node.

Figure 8:
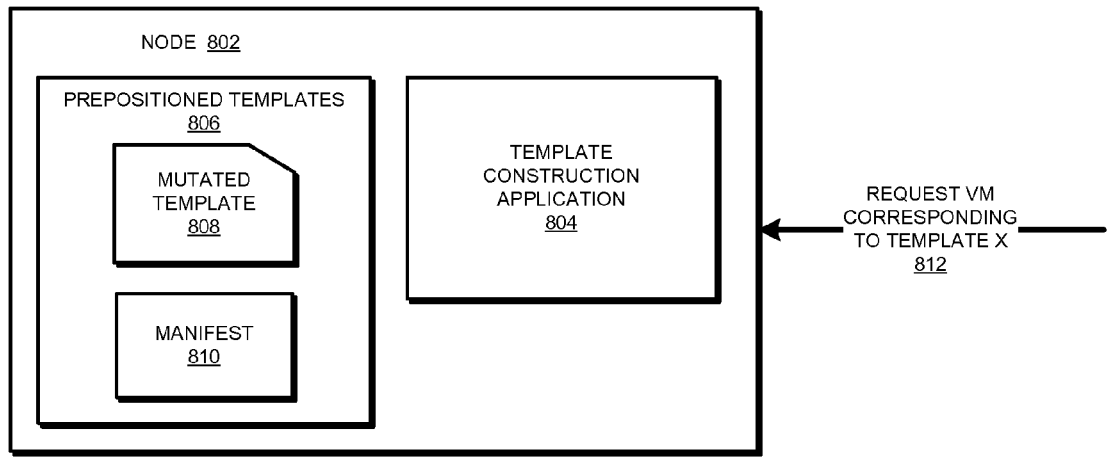
FIG. 8 depicts a block diagram of an example configuration for using a preprovisioned mutated template at a compute node in accordance with an illustrative embodiment.

With reference to FIG. 8, this figure depicts a block diagram of an example configuration for using a preprovisioned mutated template at a compute node in accordance with an illustrative embodiment. Compute node 802 is analogous to partition 203 in FIG. 2. Template construction application 804 is analogous to template construction application 216 in FIG. 2.

Preprovisioned templates 806 is a collection of templates that have been preprovisioned on compute node 802. For example, preprovisioned templates 806 may be a local repository of preprovisioned templates, which is associated with or accessible from compute node 802. Preprovisioned templates 806 includes mutated template 808 and corresponding manifest 810. Mutated template 808 and manifest 810 correspond to mutated template 416 and manifest 418 in FIG. 4. Manifest 810 can take the form of manifest 612 in FIG. 6, or manifest 702 in FIG. 7, or manifest 704 in FIG. 7.

At some point in the operation, compute node 802 receives request 812 to create a VM according to template X. assume that template X is included in mutated template 808 and can be reconstructed there from. Template construction application 804 reconstructs template X from mutated template 808 using manifest 810 in response to the request.

As described elsewhere with respect to an embodiment, manifest 810, if existing on node 802, is stored only once for mutated template 808 that may be preprovisioned multiple times on node 802. In another embodiment, manifest 810 to construct template X from mutated template 808 may be transferred over a data network, such as data network 526 in FIG. 5, if manifest 810 does not exist on node 802 at the time template X is requested on node 802.

In one embodiment, all blocks of template X may have been included in mutated template 808. Thus, request 812 can be serviced without transferring template X from a repository and adding data traffic to the data network. In another embodiment, some but not all blocks of template X may have been included in mutated template 808. Thus, request 812 can be serviced by transferring only the non-included blocks of template X from a repository and reducing the data traffic on the data network due to the transfer.

Figure 9:
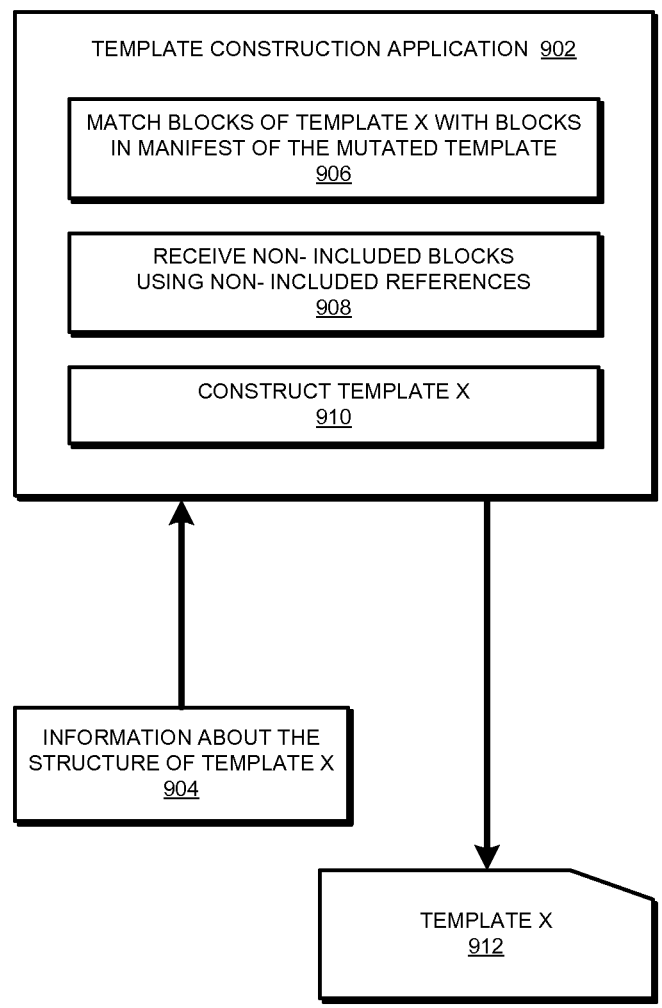
FIG. 9 depicts a block diagram of an example configuration of a template construction application in accordance with an illustrative embodiment.

With reference to FIG. 9, this figure depicts a block diagram of an example configuration of a template construction application in accordance with an illustrative embodiment. Template construction application 902 may be used as template construction application 804 in FIG. 8.

In this example configuration, template construction application 902 constructs template X according to request 812 of FIG. 8, using mutated template 808 and manifest 810 of FIG. 8, where manifest 810 of FIG. 8 takes the form of manifest 612 in FIG. 6. In order to construct template X from mutated template 808, template construction application 902 uses information 904 about template X's structure. Information 904 describes the blocks that are part of template X, their order, and any other similarly usable information about template X.

Using manifest 810 and information 904, template construction application 902 performs match operation 906, which matches blocks of template X from information 904 with blocks described in manifest 810 of mutated template 808. Using non-included references from manifest 810, or by using other available knowledge of template data sources, receive operation 908 receives the blocks of template X that are not included in mutated template 808.

Using the blocks from match operation 906 and receive operation 908, template construction application 902 performs reconstruction operation 910. Template construction application 902 outputs template X 912. In one embodiment, template construction application 902 constructs template X 912 from an instance of mutated template 808 "in-place", i.e., mutated template 808 is transformed by either keeping the i-th block as is or by replacing the i-th block with another block copied into the i-th block location from either another part of mutated template 808 or upon receiving such block from a repository.

Advantageously, a mutated template according to an embodiment allows preprovisioning several templates at a computing node, while reducing the preprovisioning data size. Even if not all blocks of all templates are accommodated in one or more mutated templates, an embodiment reduces the data traffic on the data network by transferring only the non-included blocks of some templates, as those templates are needed. An embodiment applies a known compression technique to the mutated template of an embodiment and further reduces the amount of data transferred in preprovisioning. A template construction application, such as template construction application 902, decompresses the mutated template before performing the operations described above.

Figure 10:
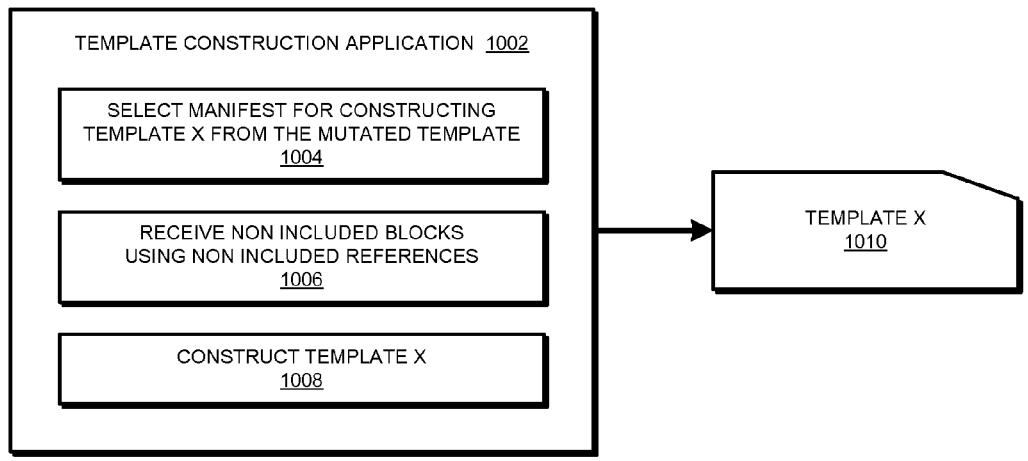
FIG. 10 depicts a block diagram of an example configuration of a template construction application in accordance with an illustrative embodiment.

With reference to FIG. 10, this figure depicts a block diagram of an example configuration of a template construction application in accordance with an illustrative embodiment. Template construction application 1002 may be used as template construction application 804 in FIG. 8.

In this example configuration, template construction application 1002 constructs template X according to request 812 of FIG. 8, using mutated template 808 and manifest 810 of FIG. 8, where manifest 810 of FIG. 8 takes the form of manifest 704 or 714 in FIG. 7. In order to construct template X from mutated template 808, template construction application 1002 selects 1004 the manifest that is configured for reconstructing template X from mutated template 808 in FIG. 8, such as manifest 704 in FIG. 7.

Using manifest 810 and the manifest for template X selected there from, template construction application 1002 copies or retrieves those blocks from mutated template 808 that are needed in template X according to the entries in manifest 810. Using non-included references from manifest 810, or by using other available knowledge of template data sources, receive operation 1006 receives the blocks of template X that are not included in mutated template 808.

Using the blocks selected from mutated template 808 and those received as a result of receive operation 1006, template construction application 1002 performs reconstruction operation 1008. Template construction application 1002 outputs template X 1010.

Figure 11:
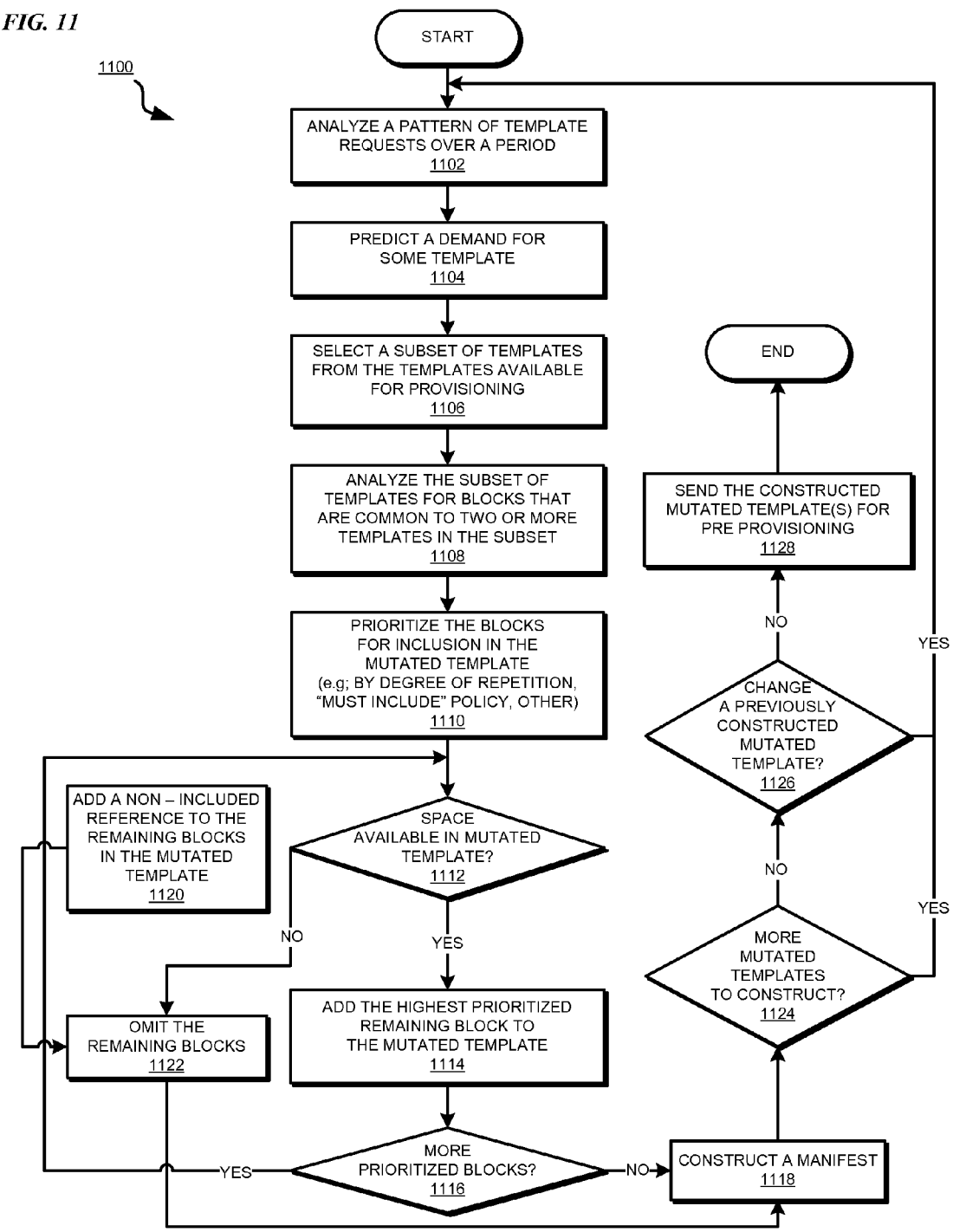
FIG. 11 depicts a flowchart of an example process of constructing a mutated template for preprovisioning in accordance with an illustrative embodiment.

With reference to FIG. 11, this figure depicts a flowchart of an example process of constructing a mutated template for preprovisioning in accordance with an illustrative embodiment. Process 1100 can be implemented in mutated template construction application 602 in FIG. 6.

Process 1100 begins by analyzing a pattern of requests for templates over a period (step 1102). Process 1100 predicts a demand for certain templates over another period (step 1104).

Process 1100 selects a subset of templates from a set of templates available for provisioning (step 1106). Process 1100 analyzes the subset of templates to identify blocks that are common to two or more templates in the subset (step 1108). Process 1100 prioritizes the blocks of the templates in the subset, including a single copy of the common blocks identified in step 1108, for inclusion in the mutated template (step 1110).

For example, in one embodiment, process 1100 prioritizes the blocks for inclusion according to a degree of repetition of the blocks in the subset of templates. For example, if block B1 occurred in 3 out of 4 templates in the subset, and block B2 occurred in 2 out of the 4 templates, the embodiment would order one copy of block B1 for inclusion in the mutated template before one copy of block B2.

In another example embodiment, process 1100 prioritizes the blocks for inclusion in the mutated template according to a policy. For example, a policy in a given virtualized data processing environment may specify that certain blocks must be included in the mutated template first, regardless of their repetition or occurrence in a selected subset of templates. Accordingly, the embodiment includes those blocks ahead of any other blocks prioritized in any other suitable manner.

In another embodiment, at step 1110, process 1100 may solve an optimization problem that includes minimization of a cost function dependent on inclusion or exclusion of a block from different templates being considered. Furthermore, the optimization problem may use a constraint on the size of the mutated template being constructed. For example and without implying a limitation thereto, the cost function may minimize the expected network data traffic in the manner described elsewhere in this disclosure. An output of such an optimization step is a list of selected blocks from the templates that should be included in the mutated template.

However, such optimization step does not provide a location information corresponding to a selected block within the mutated template. The placement of a selected block at a certain block location in the mutated template involves solving another problem in an embodiment—trying to place at location i of the mutated template that block from the selected blocks which has the highest demand at that location i across all considered templates, and which has not already been placed in the mutated template earlier. If no such selected block exists then the embodiment chooses from those selected blocks for positions lower than i which could be placed at location i and choose the block which has the maximum demand amongst the selected blocks. Otherwise the embodiment marks location i as available and proceed to filling the next location. This placement process of the embodiment continues until the embodiment reaches the last block of the mutated template.

Returning to the depictions of FIG. 11, process 1100 determines whether space is available in the mutated template for adding a prioritized block (step 1112). For example, as described elsewhere in this disclosure, a policy or another factor may limit the size of the mutated template, thereby limiting the amount of data, or the number of blocks, that can be included in the mutated template. if space is available in the mutated template ("Yes" path of step 1112), process 1100 adds the highest prioritized remaining block to the mutated template (step 1114).

Process 1100 determines whether more prioritized blocks remain (step 1116). If more prioritized blocks remain to be added to the mutated template ("Yes" path of step 1116), process 1100 returns to step 1112. If no more prioritized blocks remain to be included in the mutated template ("No" path of step 1116), process 1100 constructs a manifest for the mutated template (step 1118)

Returning to step 1112, if process 1100 determines that no more space is available in the mutated template to include a prioritized block ("No" path of step 1112), process 1100 optionally adds to the mutated template a non-included reference to a remaining prioritized block (step 1120). Process 1100 proceeds to step 1122 thereafter. Alternatively, omitting step 1120, process 1100 may proceed from the "No" path of step 1112 to step 1122, where process 1100 omits the non-included blocks of the templates in the subset (step 1122). Process 1100 proceeds to step 1118 thereafter.

Proceeding from step 1118, process 1100 determines whether more mutated templates have to be created in a similar manner (step 1124). If more mutated templates have to be constructed in a similar manner ("Yes" path of step 1124), process 1100 returns to step 1102.

If no more mutated templates are to be created ("No" path of step 1124), process 1100 determines whether one or more of the previously constructed mutated templates have to be changed (step 1126). For example, a template included in a previously constructed mutated template may have changed as a result of an administrator reconfiguring a storage subsystem, a policy, an update to a VM component included in the template, or any of several other possible reasons. If a previously constructed mutated template has to be changed ("Yes" path of step 1126), process 1100 returns to step 1102.

If no previously constructed mutated templates have to be modified ("No" path of step 1126), process 1100 sends the constructed mutated template(s) and their corresponding manifest(s) for preprovisioning (step 1128). Process 1100 ends thereafter.

Figure 12:
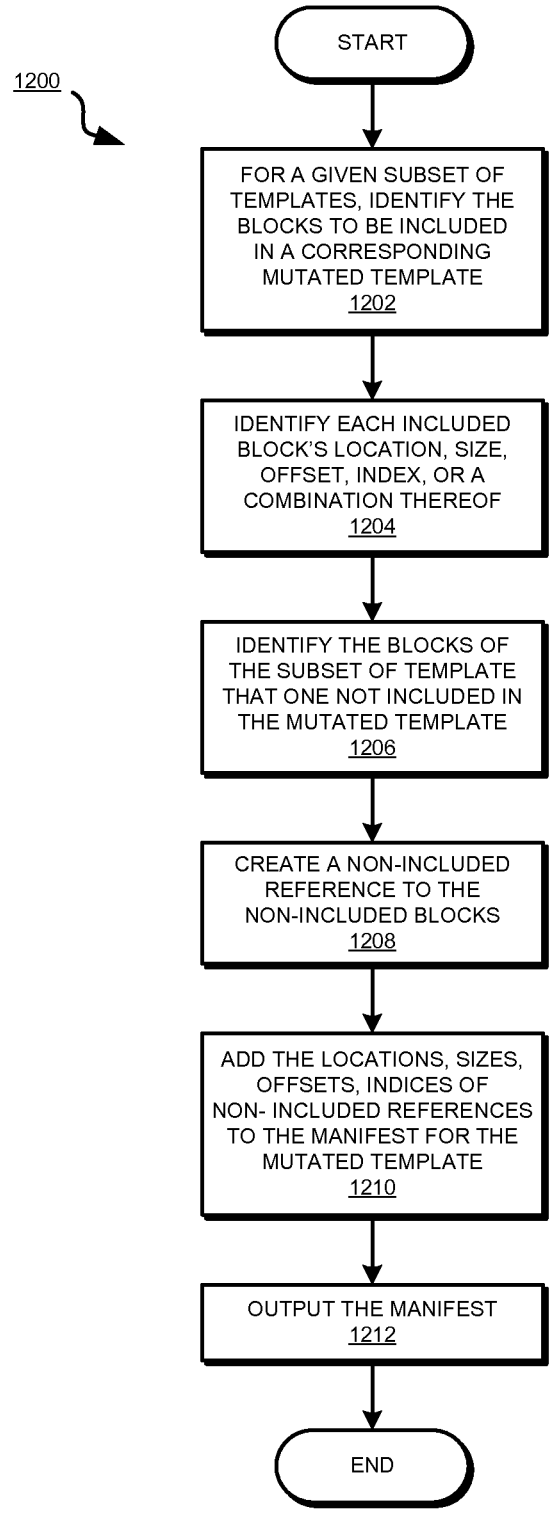
FIG. 12 depicts a flowchart of an example process for constructing a manifest corresponding to a mutated template in accordance with an illustrative embodiment.

With reference to FIG. 12, this figure depicts a flowchart of an example process for constructing a manifest corresponding to a mutated template in accordance with an illustrative embodiment. Process 1200 can be implemented in conjunction with process 1100 of FIG. 11, in mutated template construction application 602 of FIG. 6.

Process 1200 begins by identifying, for a given subset of templates, such as the subset selected in step 1106 of process 1100 in FIG. 11, the blocks to be included in a corresponding mutated template (step 1202). Process 1200 identifies each included block's location, size, offset, index, or a combination thereof (step 1204).

Process 1200 identifies the blocks of the subset of templates that are not to be included in the mutated template, such as due to a size threshold of the mutated template, (step 1206). Process 1200, optionally, creates non-included references to some or all of the non-included blocks (step 1208). Process 1200 adds the locations, sizes, offsets, indices, non-included references, or a combination thereof, to the manifest of the mutated template (step 1210). Process 1200 outputs the manifest (step 1212). Process 1200 ends thereafter.

In one embodiment, process 1200 can be adapted to output a manifest that corresponds to manifest 612 in FIG. 6. In another embodiment, process 1200 can be adapted to output a manifest that corresponds to manifest 702 in FIG. 7. In another embodiment, process 1200 can be adapted to output a manifest that corresponds to manifest 704 or manifest 714 in FIG. 7.

Figure 13:
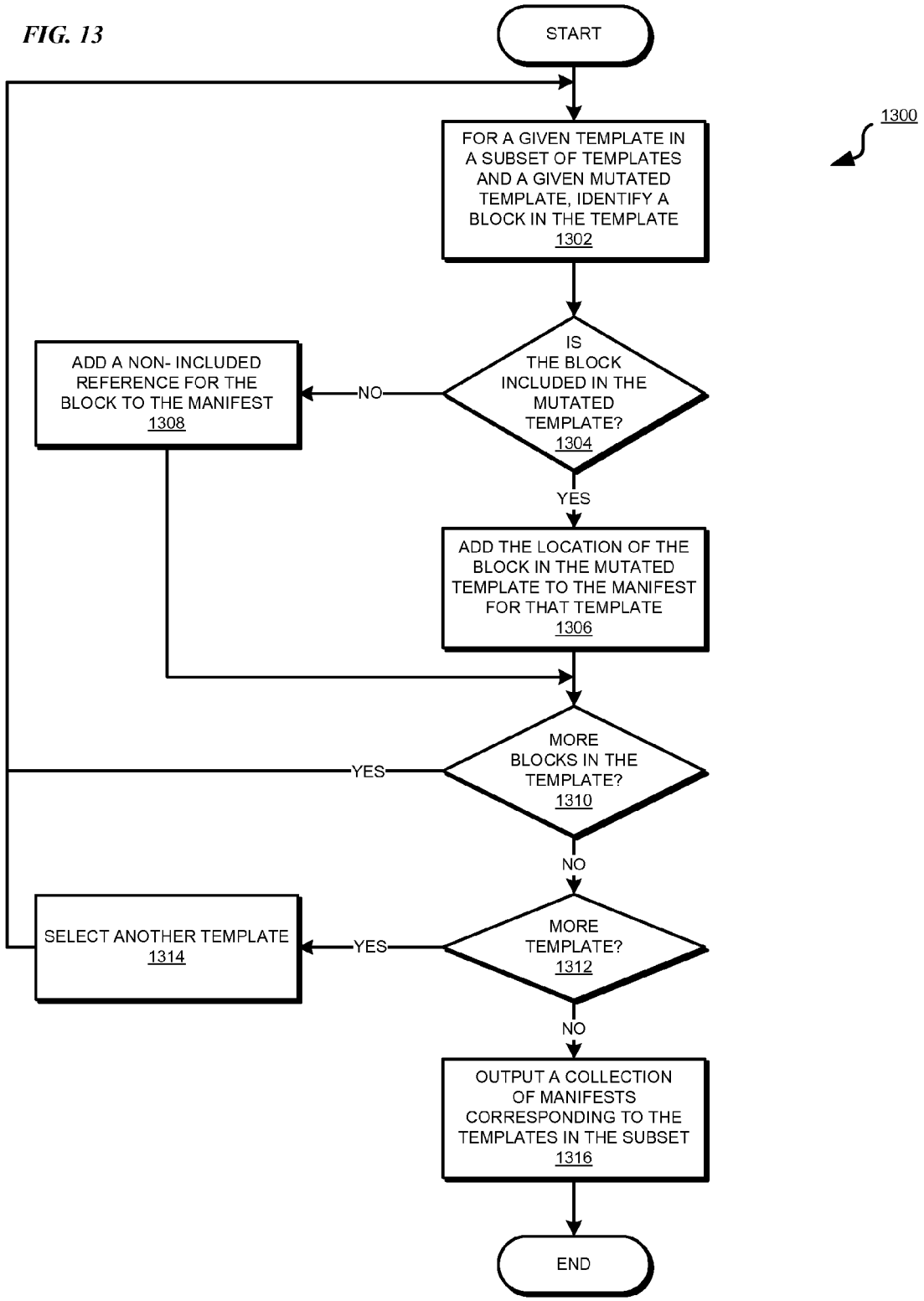
FIG. 13 depicts a flowchart of another example process of creating template-specific manifests corresponding to a mutated template in accordance with an illustrative embodiment.

With reference to FIG. 13, this figure depicts a flowchart of another example process of creating template-specific manifests corresponding to a mutated template in accordance with an illustrative embodiment. Process 1300 can be implemented in mutated template construction application 602 in FIG. 6, and can be used to output a template-specific manifest, such as manifest 704 in FIG. 7.

Process 1300 begins by identifying, for a given template in a selected subset of templates and a corresponding mutated template, a block in the template (step 1302). Process 1300 determines whether the block is included in the mutated template (step 1304). If the block is included in the mutated template ("Yes" path of step 1304), process 1300 adds a location of that block in the mutated template to a manifest specific to the template (step 1306). Process 1300 proceeds to step 1310 thereafter. If the block is not included in the mutated template ("No" path of step 1304), process 1300, optionally, adds a non-included reference to the block in the manifest specific to the template (step 1308). Process 1300 proceeds to step 1310 thereafter.

Process 1300 determines whether more blocks remain the template (step 1310). If more blocks remain the template ("Yes" path of step 1310), process 1300 returns to step 1302 and selects another block.

Process 1300 determines if another template in the subset has to be processed in this manner for creating another template-specific manifest (step 1312). If another template is to be processed ("Yes" path of step 1312), process 1300 selects another template from the subset (step 1314). Process 1300 returns to step 1302 thereafter.

If not more templates are to be processed ("No" path of step 1312), process 1300 outputs a collection of template-specific manifests correspond to the templates in the subset (step 1316). Process 1300 ends thereafter.

Figure 14:
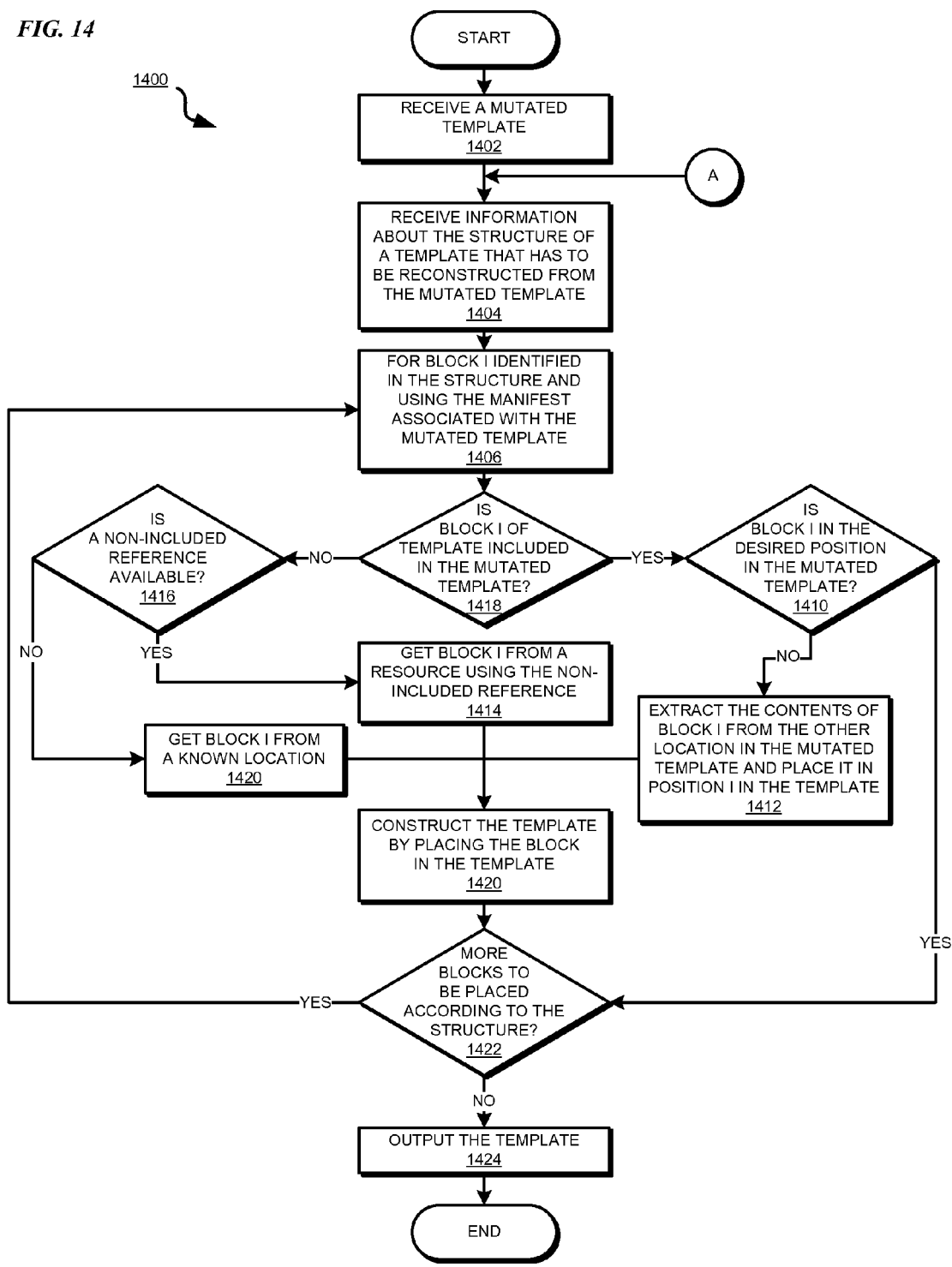
FIG. 14 depicts a flowchart of an example process of reconstructing a template from a preprovisioned mutated template in accordance with an illustrative embodiment.

With reference to FIG. 14, this figure depicts a flowchart of an example process of reconstructing a template from a pre-provisioned mutated template in accordance with an illustrative embodiment. Process 1400 can be implemented in a template construction application, such as template construction application 804 in FIG. 8.

Process 1400 begins by receiving a mutated template (step 1402). A manifest associated with the mutated template is also received in step 1402. For the purposes of process 1400, the manifest is usable to locate the blocks included in the mutated template. For example, a manifest of the form of manifest 612 in FIG. 6 can be received in step 1402 and usable in this manner.

Process 1400 further receives information about the structure of a template that has to be reconstructed from the mutated template (step 1404). Another process, such as process 1500 in FIG. 15, may also enter process 1400 at step 1404 via the entry point marked "A". in one embodiment, the structure received in step 1404 may be obtained by process 1400 in response to receiving a request for the template (not shown).

Process 1400 selects a block, such as block i, identified in the structure, for performing the subsequent steps using the manifest associated with the mutated template (step 1406). Process 1400 determines whether block i of the template is included in the mutated template (step 1408).

If block i is included in the mutated template ("Yes" path of step 1408), process 1400 further determines whether block i is in the desired position in the mutated template (step 1410). For example, block i may have to be at position 1 in the template but may occur at position 12 in the mutated template.

If the block is not in the desired position in the mutated template ("No" path of step 1410), process 1400 extracts the contents of the block from the position of the block in the mutated template and places the contents in the desired position (step 1412). Process 1400 proceeds to step 1414. If the block appears is the desired position in the mutated template ("Yes" path of step 1410), process 1400 proceeds to step 1422.

For example, in one embodiment, the template construction application may not create a separate template data structure but modify the data structure of the mutated template to transform the mutated template into the template. In such an embodiment, the contents of block i are moved from the original position of block i in the mutated template to the desired position in the mutated template. In another embodiment, the template construction application may construct the template as a separate data structure, by copying data of the various blocks from the data structure of the mutated template to the data structure of the template.

Returning to step 1408, if the block—block i—is not included in the mutated template ("No" path of step 1408), process 1400 determines whether a non-included references is available in the mutated template for block i (step 1416). If a non-included reference is available ("Yes" path of step 1416, process 1400 receives block i from a source using the non-included reference (step 1418). If a non-included reference is not available for block i ("No" path of step 1416), process 1400 receives the contents of block i from a known location (step 1420).

Proceeding from step 1414, process 1400 determines whether more blocks are to be placed according to the structure to reconstruct the template (step 1422). If more blocks are to be places ("Yes" path of step 1422), process 1400 returns to step 1406 and selects another block, such as block j, identified in the structure.

If no more blocks remain to be placed according to the structure ("No" path of step 1422), process 1400 outputs the template (step 1424). Process 1400 ends thereafter.

Figure 15:
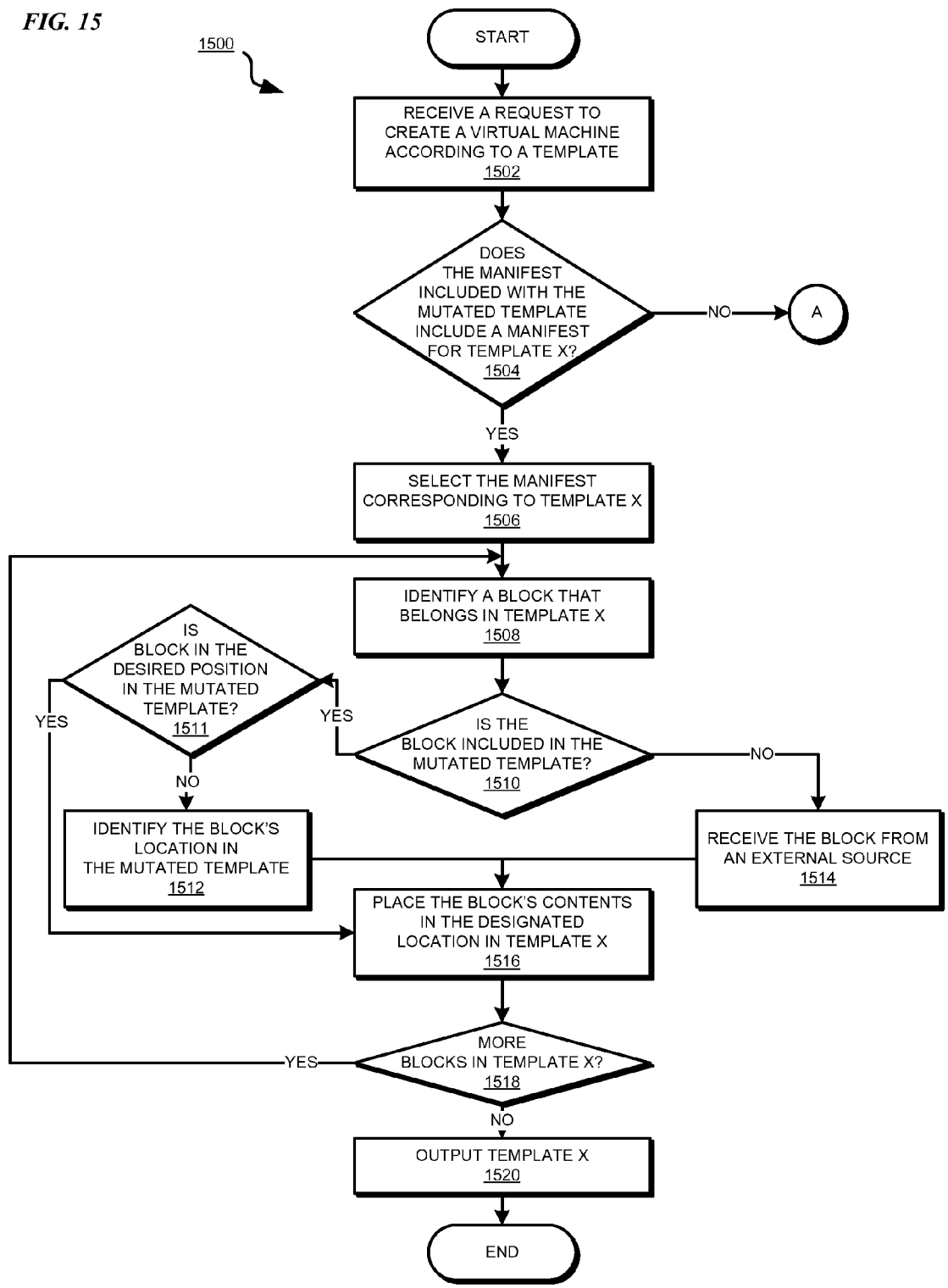
FIG. 15 depicts a flowchart of another example process of reconstructing a template from a preprovisioned mutated template in accordance with an illustrative embodiment.

With reference to FIG. 15, this figure depicts a flowchart of another example process of reconstructing a template from a preprovisioned mutated template in accordance with an illustrative embodiment. Process 1500 can be implemented in a template construction application, such as template construction application Process 1500 receives a request for a template, template X (step 1502). Process 1500 determines whether a manifest for template X is associated with the preprovisioned mutated template (step 1504). If a template-specific manifest for template X is not associated with the preprovisioned mutated template ("No" path of step 1504), process 1500 exits at exit point marked "A" and enter another process, such as process 1400 via corresponding entry point marked "A".

If the template-specific manifest for template X is available in conjunction with the preprovisioned mutated template ("Yes" path of step 1504), process 1500 selects the template-specific manifest corresponding to template X (step 1506). Process 1500 identifies a block that belongs in template X (step 1508). For example, process 1500 may use the template-specific manifest or an otherwise known structure of template X to select the block.

Process 1500 determines whether the block is included in the mutated template (step 1510). If the block is included in the mutated template ("Yes" path of step 1510), process 1500 identifies the block's location in the mutated template, such as by using an index or offset information in the manifest (step 1512). process 1500 determines if the block is in the desired position in the mutated template (step 1511). If the block is not in the desired position ("No" path of step 1511), process 1500 identifies the block's location in the mutated template, such as by using an index or offset information in the manifest (step 1512). If the block is in the desired position ("Yes" path of step 1511), process 1500 proceeds to step 1516.

If the block is not included in the mutated template ("No" path of step 1510), process 1500 receives the block from an external source (step 1514). For example, process 1500 may use a non-included reference to the block from the manifest, or use another known source of the block, to obtain the block.

Following step 1512 or 1514, process 1500 places the block's contents in the designated location in template X (step 1516). For example, in one embodiment, process 1500 may modify the mutated template's data structure to create template X's data structure. In such an embodiment, the contents of the block are moved from the original position of the block in the mutated template to the desired position in the mutated template. In another embodiment, template X may be constructed as a separate data structure, by copying data of the various blocks from the data structure of the mutated template to the data structure of template X.

Process 1500 determines whether more blocks of template X have to be assembled in this manner (step 1518). If more blocks of template X are to be assembled ("Yes" path of step 1518), process 1500 returns to step 1508 and identifies another block that belongs to template X. If no more blocks of template X are to be assembled ("No" path of step 1518), process 1500 outputs template X (step 1520). Process 1500 ends thereafter.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a method for using preprovisioned mutated templates. An embodiment enables preprovisioning a subset of provisionable templates to compute nodes without having to preprovision each template in the subset completely. An embodiment preprovisions a mutated template in place of the subset. The mutated template includes a single copy of the blocks that are duplicated across several templates in the subset, and includes the blocks in an order of prioritization that allows efficient reconstruction of templates from the mutated template. The manifest corresponding to the mutated template guides a template construction application in reconstructing a template from the mutated template. Blocks that are omitted from the mutated template can be obtained from other sources, such as from a data source over a data network. Thus, an embodiment can reduce the data traffic resulting from template provisioning by reconstructing a template completely or partially from the mutated template, and accessing only the non-included blocks over the data network.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or a mobile ad hoc network (MANET), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational blocks to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, a set includes one or more members unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for creating a virtual machine using a preprovisioned mutated template, the method comprising:
    identifying, using a processor and a memory, an identifier of a template, wherein the virtual machine is to be created on a data processing system using the template, the template being a member of a set of templates included in the mutated template;
    selecting a block of data in the mutated template for reconstructing the template from the mutated template, wherein a manifest associated with the mutated template specifies a location in the mutated template where the block of data is included in the mutated template, and wherein the manifest is usable to reconstruct the template specifically from the set of templates;
    populating a data structure of the template with the block of data such that the block of data occupies a predetermined position in the template, thereby reconstructing the template from the mutated template; and
    creating the virtual machine on the data processing system using the template.

2. The method of claim 1, further comprising:
    identifying a second block of data to be included in the template for the reconstructing;
    determining that the mutated template does not include the second block of data;
    receiving the second block of data from a source; and
    populating the data structure of the template with the second block of data such that the second block of data occupies a second predetermined position in the template.

3. The method of claim 2, further comprising:
    finding a reference to the source in the manifest; and
    using the reference to access the source and receive the second block of data.

4. The method of claim 2, wherein the source is known to provide the second block of data.

5. The method of claim 1, further comprising:
    receiving information describing a structure of the template;
    identifying the block of data as being a part of the structure of the template; and
    further identifying, using the structure, the location for the block of data in the template.

6. The method of claim 1, wherein the location of the block of data in the template is different from the location of the block of data specified in the manifest associated with the mutated template.

7. The method of claim 1, wherein the manifest specifies a plurality of blocks of data to be included in the template, the plurality of blocks of data including the block of data, wherein the manifest further specifies a first position for the block of data in the template, further comprising:
    identifying, using the manifest, a position of the block of data in the mutated template; and
    moving the block of data from the position in the mutated template to the first position in the mutated template.

8. The method of claim 7, further comprising:
    modifying a data structure of the mutated template to transform the data structure of the mutated template into the data structure of the template, and wherein the moving is a part of the modifying.

9. The method of claim 1, further comprising:
    receiving a request for creating the virtual machine, wherein the identifying the template is responsive to receiving the request.

10. The method of claim 1, wherein the manifest corresponds to the template.

11. The method of claim 1, wherein the manifest corresponds to the mutated template.

* * * * *